US012575673B2

(12) United States Patent
Isele

(10) Patent No.: US 12,575,673 B2
(45) Date of Patent: Mar. 17, 2026

(54) FURNITURE FITTING FOR MOUNTING A FURNITURE PART

(71) Applicant: Julius Blum GmbH, Hoechst (AT)

(72) Inventor: Olaf Isele, Lustenau (AT)

(73) Assignee: JULIUS BLUM GMBH, Hoechst (AT)

( * ) Notice: Subject to any disclaimer, the term of this patent is extended or adjusted under 35 U.S.C. 154(b) by 139 days.

(21) Appl. No.: 18/095,250

(22) Filed: Jan. 10, 2023

(65) Prior Publication Data

US 2023/0157449 A1 May 25, 2023

Related U.S. Application Data

(63) Continuation of application No. PCT/AT2021/060229, filed on Jun. 30, 2021.

(30) Foreign Application Priority Data

Jul. 16, 2020 (AT) .............................. A 50616/2020

(51) Int. Cl.

| | |
|---|---|
| ***A47B 88/40*** | (2017.01) |
| ***A47B 88/423*** | (2017.01) |
| ***A47B 88/453*** | (2017.01) |
| ***A47B 88/473*** | (2017.01) |

(52) U.S. Cl.

CPC .......... *A47B 88/423* (2017.01); *A47B 88/453* (2017.01); *A47B 88/473* (2017.01); *E05Y 2800/682* (2013.01)

(58) Field of Classification Search

CPC ..... A47B 88/40; A47B 88/423; A47B 88/453; A47B 88/473

See application file for complete search history.

(56) References Cited

U.S. PATENT DOCUMENTS

| | | | | |
|---|---|---|---|---|
| 5,556,183 A | | 9/1996 | Brüstle et al. | |
| 5,601,350 A | * | 2/1997 | Rock ...................... | A47B 88/43 312/348.1 |
| 5,683,221 A | * | 11/1997 | Ablabutyan .......... | B60P 1/4457 410/94 |
| 5,775,788 A | * | 7/1998 | Sasse .................. | A47B 88/493 312/334.44 |
| 6,052,945 A | | 4/2000 | Asada et al. | |

(Continued)

FOREIGN PATENT DOCUMENTS

| | | |
|---|---|---|
| AT | 508 139 | 11/2010 |
| AT | 520690 | 6/2019 |

(Continued)

OTHER PUBLICATIONS

International Search Report issued Oct. 18, 2021 in International (PCT) Application No. PCT/AT2021/060229.

*Primary Examiner* — James O Hansen
(74) *Attorney, Agent, or Firm* — Wenderoth, Lind & Ponack, L.L.P.

(57) ABSTRACT

A furniture fitting for mounting, preferably movably, a first furniture part onto a second furniture part, includes a metal piece made from sheet metal, more particularly a connecting piece, having two faces spaced apart from one another by a material thickness of the sheet metal. The two faces have a regular arrangement of successive elevations and depressions, and one elevation on one of the two faces lies opposite a depression on the other of the two faces, and vice versa.

28 Claims, 9 Drawing Sheets

(56) References Cited

U.S. PATENT DOCUMENTS

| | | | | |
|---|---|---|---|---|
| 6,325,473 | B1 * | 12/2001 | Brustle ................ | A47B 88/487 312/334.6 |
| 9,149,851 | B2 | 10/2015 | Hiraoka et al. | |
| 9,296,430 | B2 | 3/2016 | Yonebayashi et al. | |
| 9,945,166 | B2 | 4/2018 | Rihtarec et al. | |
| 10,660,436 | B2 | 5/2020 | Chen et al. | |
| 11,071,380 | B2 | 7/2021 | Rihtarec | |
| 11,247,252 | B2 | 2/2022 | Fröhlich et al. | |
| 2003/0131646 | A1 | 7/2003 | Herzog et al. | |
| 2004/0262084 | A1 * | 12/2004 | Hubbard ................ | B65G 21/00 182/222 |
| 2009/0202856 | A1 | 8/2009 | Hiraoka et al. | |
| 2012/0192610 | A1 | 8/2012 | Hiraoka et al. | |
| 2014/0367999 | A1 | 12/2014 | Yonebayashi et al. | |
| 2015/0002008 | A1 * | 1/2015 | Domenig ............. | B21D 35/001 312/334.8 |
| 2017/0049232 | A1 | 2/2017 | Rihtarec et al. | |
| 2018/0087307 | A1 | 3/2018 | Hammerer | |
| 2018/0207695 | A1 | 7/2018 | Fröhlich et al. | |
| 2018/0252010 | A1 | 9/2018 | Salice | |
| 2019/0071908 | A1 | 3/2019 | Salice | |
| 2019/0166994 | A1 | 6/2019 | Rihtarec | |
| 2019/0330902 | A1 | 10/2019 | Chen et al. | |

FOREIGN PATENT DOCUMENTS

| | | |
|---|---|---|
| CN | 107532439 | 1/2018 |
| CN | 107750297 | 3/2018 |
| CN | 108699872 | 10/2018 |
| CN | 110191994 | 8/2019 |
| CN | 209644376 | 11/2019 |
| DE | 10 2010 036 903 | 9/2011 |
| EP | 0 678 255 | 10/1995 |
| EP | 3 117 922 | 1/2017 |
| EP | 3 132 713 | 2/2017 |
| ES | 1 012 634 | 8/1990 |
| ES | 1 015 513 | 7/1991 |
| GB | 457 333 | 8/2009 |
| JP | 57-205365 | 12/1982 |
| JP | 3004222 | 11/1994 |
| JP | 8-74469 | 3/1996 |
| JP | 2005-194747 | 7/2005 |
| JP | 2012-115882 | 6/2012 |
| JP | 2013-542822 | 11/2013 |
| JP | 2019-193768 | 11/2019 |
| KR | 10-2007-0100281 | 10/2007 |
| WO | 2013/094691 | 6/2013 |

* cited by examiner

FURNITURE FITTING FOR MOUNTING A FURNITURE PART

BACKGROUND OF THE INVENTION

The invention relates to a furniture fitting for, preferably movably, mounting a first furniture part on a second furniture part. The furniture fitting has at least one metal piece manufactured from a metal sheet, in particular a connecting piece, with two surfaces that are spaced apart from one another by a material thickness of the metal sheet. Furthermore, the invention relates to a piece of furniture with at least one first and one second furniture part, wherein the piece of furniture comprises at least one such furniture fitting. In addition, the invention relates to a method for producing at least one such furniture fitting, preferably at least one runner, one flap fitting or one hinge.

Generic furniture fittings are known from the state of the art, wherein such commercially available furniture fittings are formed out of a metal sheet with a defined material thickness.

A disadvantage of the state of the art according to a first aspect is that the material thickness cannot be reduced without impairing a stability of the furniture fitting such that there is an increased risk of breakage during operation and/or installation of the furniture fitting. With a minimum material thickness to be adhered to, various problems are caused by an increased weight of the furniture fitting associated therewith—such as for example an increased cost in production, environmentally damaging quantities of material and/or increased transport resources required. In addition, reduced material thicknesses are desirable in terms of manufacturing technology in particular in the case of delicate geometrical structures.

A disadvantage of the state of the art according to a second aspect is an undesired generation of noise in handling the known furniture fittings. Due to insufficient sound absorption properties, sound is reflected unimpeded by the furniture fittings and/or is transferred substantially unimpeded over an extent of the furniture fitting.

A disadvantage of the state of the art according to a third aspect is that a weight of the furniture fittings in the case of particularly high demands on the furniture fittings, such as a connection to heavy furniture parts to be moved, increases to a large degree due to the necessary rigidity of the furniture fittings, as a result of which resources are inefficiently used and the furniture fittings are difficult to handle in terms of manufacturing technology. The option of using a large number of furniture fittings is an inadequate alternative which does not solve the problem and additionally cannot be implemented practically in a large number of pieces of furniture.

SUMMARY OF THE INVENTION

The objective technical problem of the present invention is therefore to specify a furniture fitting that is improved compared with the state of the art as well as a piece of furniture and a method for producing such a furniture fitting, in which the disadvantages of the state of the art are at least partially remedied and which are characterized in particular by enhanced stability and strength properties, a reduced weight and/or improved sound absorption properties of the furniture fitting.

Therefore, according to the invention, the two surfaces have at least one regular arrangement of successive elevations and depressions, wherein an elevation on one of the two surfaces lies opposite a depression on the other of the two surfaces, and vice versa.

Firstly, this makes it possible for an increased stability, in particular rigidity, load-bearing capacity, bending strength and torsional strength, to be able to be guaranteed in the case of an identical material thickness, through a deviation from a smooth surface. In the case of a transmission of force onto the at least one metal piece, forces can be absorbed by the at least one metal piece in a particularly beneficial way via the geometry that deviates from the smooth surface, in particular by means of an increased section modulus. This makes it possible for the material thickness of the at least one metal piece to be able to be reduced in the case of given demands on the at least one metal piece.

On the other hand, it is possible for the maximum demands on the at least one metal piece to be increased since, for example, in the case of maximum material thicknesses due to manufacturing technology, more weight can be received by the at least one metal piece in the case of an unchanged weight of the at least one metal piece via the depressions and elevations. In addition, by reducing the weight of the at least one metal piece, more metal pieces can be transported and resources such as material, costs and/or $CO_2$ can be saved in the production.

In addition to this, there is the positive property that, through a surface structure obtained via the elevations and depressions, sound is absorbed to a large degree by the at least one metal piece via the at least one regular arrangement and is transferred to a small degree, as a result of which a reflection and/or a development of sound is lessened. In addition, the aesthetic appearance of the at least one metal piece is enhanced.

Through the surface structure—due to the at least one regular arrangement—a material and weight saving can be universally obtained in the case of a wide variety of types of furniture fitting, such as furniture hinges, furniture flaps, furniture fittings, furniture guides and/or component parts of furniture fittings, via a reduced material thickness with the same strength and/or an increased strength with the same material thickness, wherein in particular acoustic and visual properties are enhanced.

The regular arrangement can be introduced into the at least one metal piece—in particular partially or completely—for example by embossing, rolling and/or profiling before and/or after an optionally present bending and/or embossing step. Generally speaking, the regular arrangement can be introduced superimposed with respect to a ribbing and/or profiling in the at least one metal piece.

A corrugation of the at least one metal piece over the at least one regular arrangement causes an additional stiffening effect, wherein a neutral axis can be lengthened in the shaping of the at least one metal piece, for example existing sheet metal bending machines can be used and/or no incisions or one-sided dips in a surface of the at least one metal piece are necessary for the at least one regular arrangement.

As stated at the start, protection is also sought for a piece of furniture with at least one first furniture part and at least one second furniture part, wherein the piece of furniture comprises at least one such furniture fitting, with which the at least one first furniture part is mounted, preferably movably, on the at least one second furniture part.

This makes it possible for a reduced number of furniture fittings to be needed for moving and/or mounting the furniture parts, and for a visual appearance of the piece of furniture to be enhanced. In addition, heavier furniture parts with furniture fittings of a given material thickness—in particular a maximum material thickness—can be used in the piece of furniture.

As stated at the start, protection is also sought for a method for producing at least one such furniture fitting, preferably at least one runner, one flap fitting or one hinge, characterized by the following method steps, preferably following one another in terms of time in the indicated order:

at least one flat metal sheet is provided, in at least one partial area of the at least one metal sheet at least one regular arrangement of successive elevations and depressions is incorporated on two surfaces that are spaced apart from one another by a material thickness of the metal sheet, wherein an elevation on one of the two surfaces lies opposite a depression on the other of the two surfaces, and vice versa, by at least one bending, punching, cutting, coating and/or embossing step the at least one metal sheet is formed into at least one component of the furniture fitting to be produced.

The method is particularly flexible in the production of the at least one furniture fitting since, for example after an introduction of a microstructure through the elevations and depressions, areas can be punched out of the metal sheet, which is also possible with settings of a punching machine for commercially available furniture fittings, then the metal sheet can be bent onto the desired geometric design and further punching operations can be effected by the punching machine, wherein embossings can be introduced into the microstructure present on the metal sheet at any time.

Protection is also sought for a use of the formation of at least one regular arrangement of successive elevations and depressions on two surfaces, which are spaced apart from one another by a material thickness of a metal sheet, of at least one metal piece manufactured from a metal sheet, in particular a connecting piece, of a furniture fitting, wherein an elevation on one of the two surfaces lies opposite a depression on the other of the two surfaces, and vice versa, in order to increase a rigidity and/or a sound absorption of the furniture fitting at least in areas.

Through the elevations and depressions, a particularly user-friendly furniture fitting can be provided, wherein the convenience of using the furniture fitting is increased.

According to an advantageous design of the invention, the at least one regular arrangement extends in a first direction and in at least one second direction transverse to the first direction, with the result that arranged adjacent to a depression in each case is a first elevation in the first direction and a second elevation in the second direction.

The at least one metal piece thereby has a two-dimensional regular arrangement, as a result of which material thickness can be particularly effectively reduced with the same stability and/or strength. In addition, the visual and acoustic properties of the furniture fitting are particularly positively influenced.

It has proved to be particularly beneficial that a neutral axis of the at least one metal piece is bidirectionally plastically deformed, with the result that the neutral axis is deformed by the at least one regular arrangement—preferably symmetrically, substantially sinusoidally and/or alternately—both in the direction of the first surface and in the direction of the second surface.

It is advantageously provided that, in each case on a surface, maxima of the elevations and depressions of the at least one regular arrangement are arranged on imaginary lines which are arranged substantially parallel to one another. Preferably, the elevations and depressions of a first line are arranged offset by half a spacing between two elevations or depressions compared with the elevations and depressions of a second line directly adjacent to the first line.

Through this geometric arrangement of the elevations relative to the depressions, material-specific characteristics such as bending strength, are enhanced to a particularly high degree, in particular through a particularly advantageous exploitation of the section modulus.

It has proved to be beneficial that the elevations and/or depressions of the at least one regular arrangement are formed substantially pyramid-shaped, conical, truncated-pyramid-shaped or frustoconical. Generally speaking, however, the shape of the elevations and/or depressions is as desired.

According to an advantageous embodiment of the invention, the material thickness of the metal sheet is substantially the same over the entire area of the at least one regular arrangement.

Apart from marginal material thickness differences caused, for example, by a stretching process in the introduction process step during a rolling, embossing and/or profiling process of the at least one regular arrangement between maxima and edges of the elevations and/or depressions, the at least one sheet metal part can have a substantially constant material thickness.

It has proved to be advantageous that the at least one metal piece has at least one embossing, which extends over at least two elevations and/or depressions of the at least one regular arrangement.

Embossings with a wide variety of functionalities are generally not disrupted by the at least one regular structure and/or can utilize sound-reducing and rigidity-increasing properties.

An advantageous variant is that the at least one regular arrangement of successive elevations and depressions has at least one periodicity.

For example, in each case, an elevation can follow a depression in both directions. The regular arrangement is, however, not limited to a specific periodicity in the sequence of the elevations and depressions.

It is particularly preferred that the material thickness of the metal sheet lies between 0.3 mm and 2.5 mm, preferably 0.4 mm and 2.0 mm, and particularly preferably is 0.5 mm or 0.7 mm.

In an embodiment of the invention, on both surfaces in each case at least three elevations that are preferably adjacent to one another have maxima which are arranged in each case in a common plane, and a normal spacing of these planes is between 0.1 mm and 1.0 mm, preferably 0.2 mm and 0.4 mm, larger than the material thickness of the metal sheet.

According to a preferred embodiment of the invention, two elevations and/or depressions that follow one another directly on one of the two surfaces have a spacing of between 1.6 mm and 21.0 mm, preferably 2.0 mm and 10.0 mm, particularly preferably 3.5 mm and 6.5 mm.

It has proved to be beneficial that on both surfaces in each case, at least three elevations that are preferably adjacent to one another have maxima which are arranged in each case in a common plane. These planes have a normal spacing and two elevations and/or depressions that follow one another directly on one of the two surfaces have a spacing, wherein the spacing is 2 to 8, preferably 3 to 7, particularly preferably 4 to 6, times as large as the normal spacing.

Furthermore, preferably on one of the two surfaces at least three elevations that are preferably adjacent to one another have maxima which are arranged in a common plane, and at least three depressions that are preferably adjacent to one another have maxima which are arranged in a common plane. The planes have a normal spacing which is between 0.1 and 0.6, preferably between 0.2 and 0.4, times as large as the material thickness of the metal sheet.

The at least one sheet metal part can be adjusted specifically to the desired properties through an appropriate choice of material thickness, normal spacing of the planes, an extent of the elevations and/or depressions which is lateral and/or points in the direction of the surface and the spacing between maxima.

Generally speaking, the elevations can be formed differently from the depressions—for example through varying extents and/or geometries. The elevations and depressions are particularly preferably formed similar and/or symmetrical.

Alternatively, it is possible for the at least one regular arrangement to:

extend over more than 50%, preferably more than 75%, of the at least one metal piece, preferably of a finished component of the furniture fitting, particularly preferably of the furniture fitting, or extend only over at least one local area, preferably wherein the local area is arranged at an edge of the at least one metal piece and/or at a connection point of the at least one metal piece, at which the at least one metal piece is connected or can be connected to a further component of the furniture fitting.

A partial regular arrangement on the at least one metal piece makes it possible to reinforce specific areas of the at least one metal piece in a targeted manner and/or to adapt them to individual requirements. Generally speaking, the at least one metal piece can also be completely provided with the at least one regular arrangement.

According to an advantageous design of the invention, the at least one metal piece has at least one flat surface, which is free of the at least one regular arrangement.

It is thereby made possible, for example, to provide areas having increased rolling and/or sliding properties.

According to an advantageous design of the invention, the at least one metal piece has a first sound absorption in the area of the at least one flat surface, and the at least one metal piece has a second sound absorption in an area with the at least one regular arrangement, wherein the second sound absorption is at least 1.1 times, preferably 1.5 times, greater than the first sound absorption.

It is advantageously provided that the at least one metal piece has a first rigidity in the area of the at least one flat surface, and the at least one metal piece has a second rigidity in an area with the at least one regular arrangement, wherein the second rigidity is at least 1.1 times, at least 1.5 times, greater than the first rigidity.

Both acoustic properties and a load-bearing capacity of the at least one metal piece can be enhanced by the at least one regular arrangement compared with a commercially available metal piece with smooth surfaces.

It has proved to be beneficial that the at least one flat surface is formed as a running surface for a rolling element moving on the running surface, preferably wherein the at least one metal piece has a longitudinal direction and the at least one running surface is formed as a track, which is aligned substantially parallel to the longitudinal direction of the at least one metal piece.

The at least one flat surface makes it possible to particularly benefit a rolling behaviour of a rolling element, wherein for example no precession of the rolling element due to unevennesses in the track is to be expected.

According to an advantageous embodiment of the invention, the at least one metal piece has at least two geometrically different regular arrangements.

Through two geometrically different regular arrangements, the at least one metal piece can be equipped with areas with varying properties—for example via different warping through varying heights from maxima of the depressions to maxima of the elevations and/or specific profile shapes of the depressions and elevations.

It has proved to be advantageous that the at least one metal piece has at least one punching, preferably wherein the at least one punching is formed for receiving at least one fastening means, and/or is formed as a fastening means for at least one furniture component, and/or is formed substantially cylindrical, and/or is formed for mounting at least one hinge pin, and/or releases at least one adjustment element of an adjustment device, with the result that the adjustment element can be actuated by means of at least one tool.

An advantageous variant is that the at least one metal piece is arranged on a profiled component of the furniture fitting, preferably wherein the component is formed U-shaped in a cross section at least in areas.

Generally speaking, the at least one metal piece can be connected to the profiled component by material bonding or detachably or can be formed as a profiled component. Bent sheet metal parts with a wide variety of profile shapes are suitable in a particularly beneficial way for the at least one regular arrangement.

It is particularly preferred that the furniture fitting is formed as a runner, flap fitting or hinge.

According to an advantageous design of the invention, the at least one bending, punching, cutting, coating and/or embossing step is effected after the incorporation of the at least one regular arrangement.

A removal of local areas by a laser can be deemed to be a cutting step, for example. It is also conceivable to carry out bending, punching, cutting, coating and/or embossing steps before or both before and after the introduction of the at least one regular arrangement.

It is advantageously provided that the at least one regular arrangement:

is incorporated in the at least one partial area of the at least one metal sheet by means of at least one stamp and/or at least one roller, and/or is incorporated starting from both surfaces.

For example, dies and/or embossing stamps with a wide variety of designs and/or cold roll forming methods can be used for an incorporation of the at least one regular arrangement.

It has proved to be beneficial that a neutral axis of the at least one metal sheet is lengthened during the incorporation of the at least one regular arrangement.

According to an advantageous embodiment of the invention, the at least one metal sheet is stretched during the incorporation of the at least one regular arrangement at least in the area in which the at least one regular arrangement is incorporated.

Through a formation of the elevations and depressions or of a shaping procedure, the neutral axis is stretched and in particular displaced in the direction of a curvature.

It has proved to be advantageous that, in a further method step, at least one embossing which extends over at least two elevations or depressions of the at least one regular arrangement is embossed into the at least one metal sheet.

An advantageous variant is that at least one, preferably strip-shaped, surface area of the at least one metal sheet is left blank during the incorporation of the at least one regular arrangement.

Particularly preferable, in at least one second partial area (portion) of the metal sheet, a second regular arrangement is incorporated on the two surfaces. The second regular arrangement is geometrically different from the first regular arrangement.

Furthermore, it is particularly preferred that in a further method step, the at least one component of the furniture fitting to be produced is connected to at least one further component, preferably by gluing, riveting, TOX clinching, soldering and/or welding, and/or in a further method step the furniture fitting is fitted with at least one drive device and/or at least one damper.

BRIEF DESCRIPTION OF THE DRAWINGS

Further details and advantages of the present invention are explained in more detail below on the basis of the description of the figures with reference to the embodiment examples represented in the drawings, in which.

DETAILED DESCRIPTION OF THE INVENTION

Figure 1A:
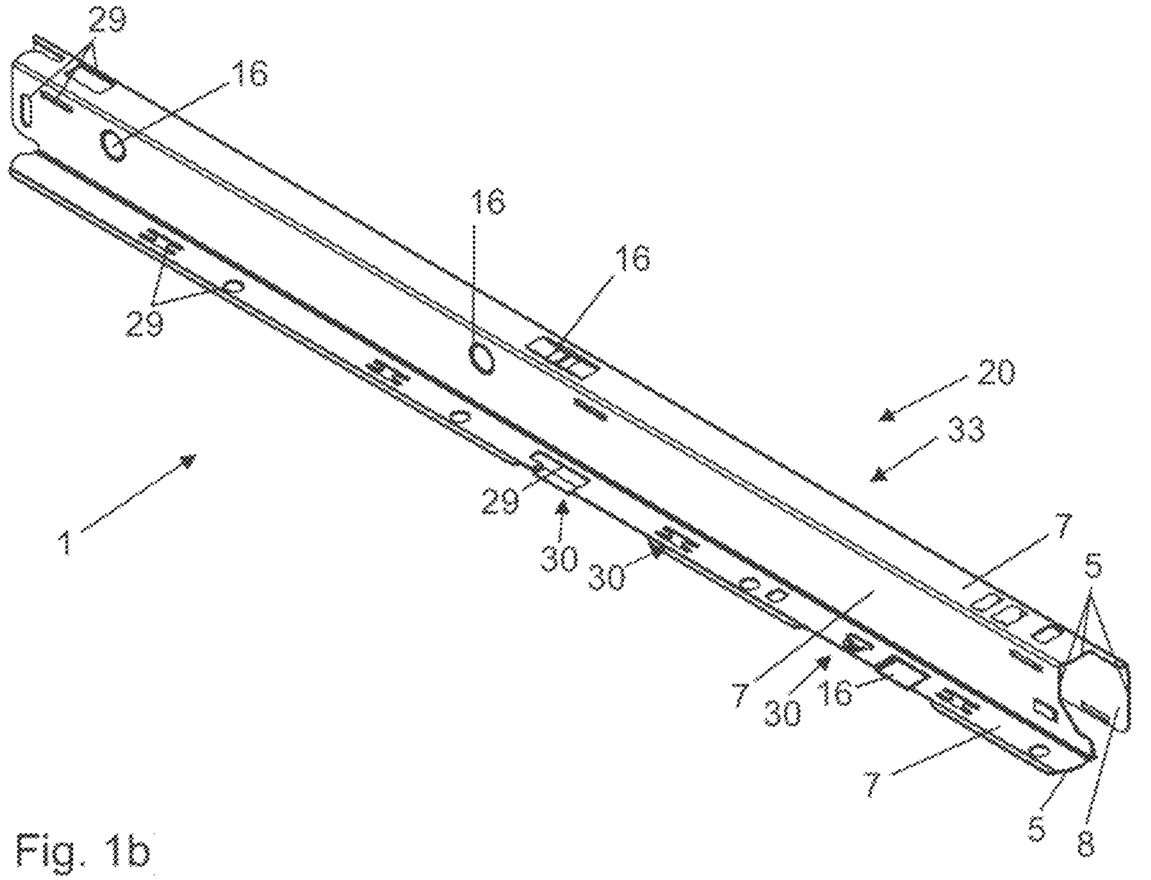
FIGS. 1*a*-1*b* show a furniture fitting in the form of a runner according to the state of the art in a perspective view and a view from the side.

FIGS. 1*a* to 4*b* show designs of furniture fittings 1 from the state of the art and not according to the invention without a regular arrangement 9 of elevations 10 and depressions 11. The regular arrangement 9 can be used in all available metal pieces 5 in order to improve the respective furniture fitting 1 in terms of stability, strength, weight, transport properties, acoustic properties and visual properties.

FIG. 1*a* shows a furniture fitting 1 in the form of a runner 33 with a plurality of embossings 16 and punchings 29, which have been introduced into a component 20. The furniture fitting 1 comprises four metal pieces 5 in the form of a connecting piece, which are formed by a bending procedure of a metal sheet 4.

Figure 1B:
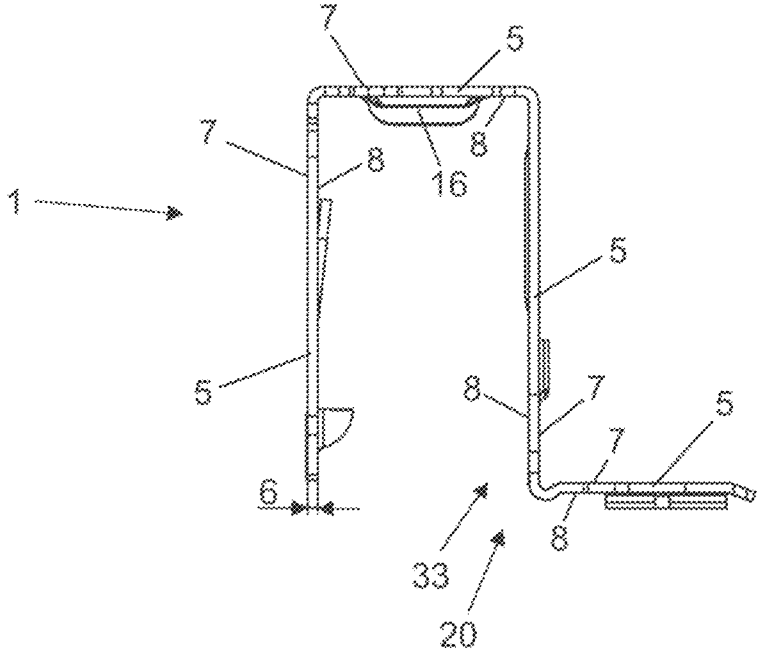

FIG. 1*b* differs from FIG. 1*a* in that the runner 33 is represented from a viewing direction from the side. The four metal pieces 5 have in each case two surfaces 7, 8, which are spaced apart from one another by a material thickness 6.

Figure 2A:
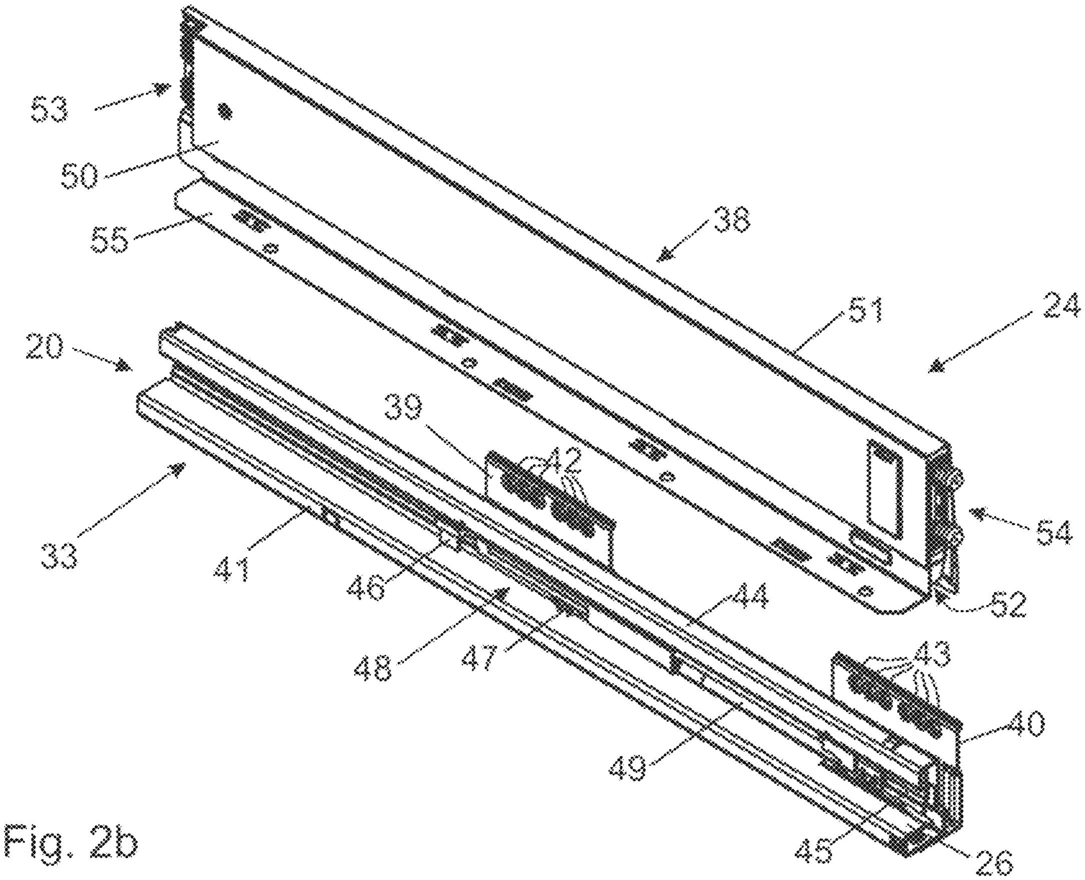
FIGS. 2*a*-2*b* show a further furniture fitting in the form of a runner according to the state of the art in a perspective view.

FIG. 2*a* shows an arrangement with a runner 33 of a drawer and with a drawer side wall 38 in a perspective view. Fastening portions 39, 40 of a first guide rail 41 have in each case one or more fastening points 42, 43 for fastening to a furniture carcass. A third guide rail 44 is connected or can be detachably connected to the drawer side wall 38, wherein a second guide rail 45 is movable between the first guide rail 41 and the third guide rail 44.

A coupling element 46, which can be detachably coupled to a follower 47 of a draw-in mechanism 48 mounted on the third guide rail 44, is arranged on the first guide rail 41, with the result that towards the end of the closing movement the third guide rail 44 is caught by the follower 47 and can be drawn into a closed end position by an energy storage means of the draw-in mechanism 48. Through a damping device 49, preferably with a hydraulic piston-cylinder unit, this spring-supported drawing-in movement of the third guide rail 44 can be damped as far as a closed end position.

The drawer side wall 38 is formed as a hollow-chamber profile with an inner profile wall 50 and an outer profile wall 51 spaced apart therefrom. The drawer side wall 38 forms a channel 52 open at the bottom and extending in the longitudinal direction of the drawer side wall 38, and in which the third guide rail 44 can be arranged. The drawer side wall 38 furthermore has a first fastening mechanism 53 for connection to a rear wall, a second fastening mechanism 54 for connection to a front panel, and a support 55 for supporting a drawer base.

Figure 2B:
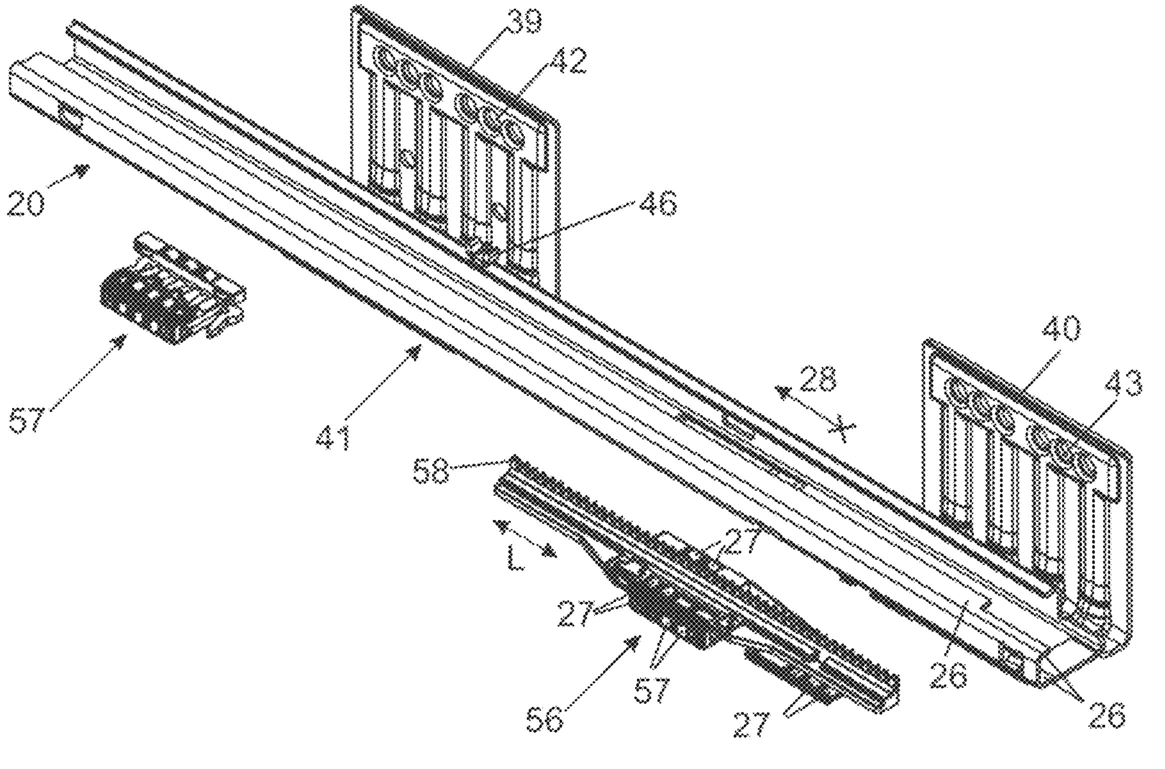

FIG. 2*b* shows the first guide rail 41 with the fastening portions 39, 40 to be installed on the furniture carcass. The first guide rail 41 has a U-shaped or C-shaped portion in cross section, in which a carriage 56 and a further carriage 57 separate therefrom are displaceably mounted for guiding and supporting the second guide rail 45. The carriage 56 and the further carriage 57 are displaceably mounted in a common running surface 26. The carriage 56 has load-transmitting rolling elements 27, the axes of rotation of which are spaced apart from one another in the vertical direction and are thus arranged in running surfaces 26 separate from one another. Furthermore, the carriage 56 also has lateral supporting rollers 57 with axes of rotation running vertically in the installed position, and the lateral supporting rollers 57 are movable along a vertical connecting piece of the first guide rail 41 running in the longitudinal direction (L) on the one hand and on a vertically running connecting piece of the second guide rail 45 on the other hand. Through a tooth system 58 arranged or formed on the carriage 56, a movement of the carriage 56 can be synchronized, via a cog wheel, with a movement of a further carriage 56 which is displaceably mounted between the second guide rail 45 and the third guide rail 44.

Figure 3A:
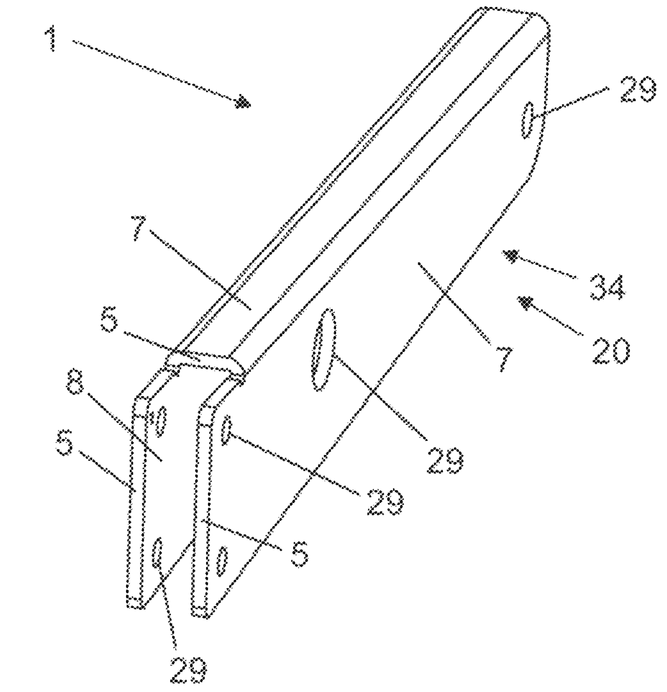
FIGS. 3*a*-3*b* show a furniture fitting in the form of a flap fitting according to the state of the art in a perspective view and a view from the side.

FIG. 3*a* shows a furniture fitting 1 in the form of a component 20 formed as a flap fitting 34. Punchings 29 in the surfaces 7, 8 through the material thickness 5 are formed for receiving fastening member 30 and are cylindrical, so that it is possible to mount a hinge pin in the punchings 29.

Figure 3B:
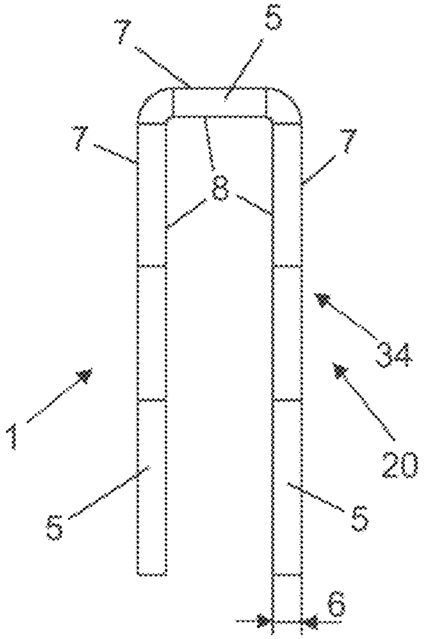

FIG. 3*b* differs from FIG. 3*a* merely in that the furniture fitting 1 is shown from the side. The flap fitting 34 has three metal pieces 5, onto which a regular arrangement 9 can be introduced.

Figure 4A:
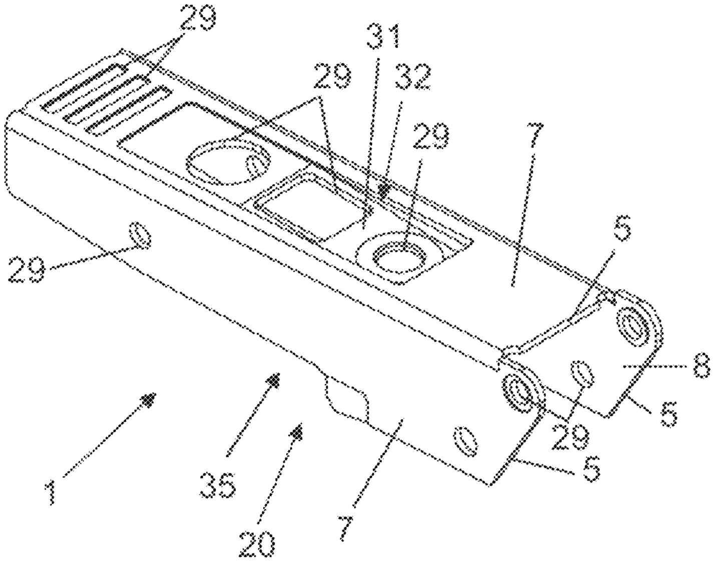
FIGS. 4*a*-4*b* show a furniture fitting in the form of a hinge according to the state of the art in a perspective view and a view from the side.

FIG. 4*a* shows a furniture fitting 1—formed as a hinge 35—with punchings 29, which an adjustment element 31 of an adjustment device 32 releases, with the result that the adjustment element 31 can be actuated by means of a tool.

The furniture fitting 1 is formed to effect a movable mounting of a first furniture part on a second furniture part, wherein the furniture fitting 1 has metal pieces 5 manufactured from a metal sheet 4 which are formed in the form of connecting pieces.

Figure 4B:
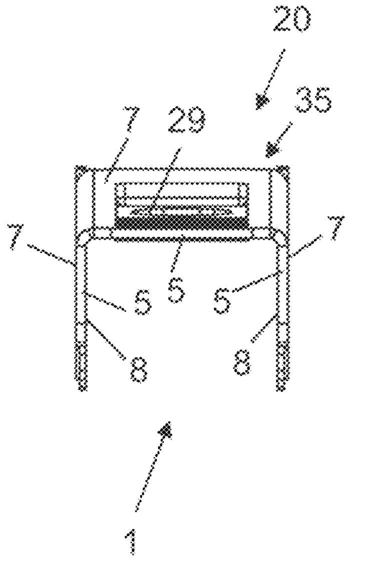

FIG. 4*b* differs from FIG. 4*a* merely in that the furniture fitting 1 is represented in a front view. It is conceivable to introduce a regular arrangement 9 into the three metal pieces 5 before or after a bending procedure of the metal sheet 4 of the furniture fitting 1, wherein the regular arrangement 9 is particularly preferably introduced before the bending procedure.

Figure 5:
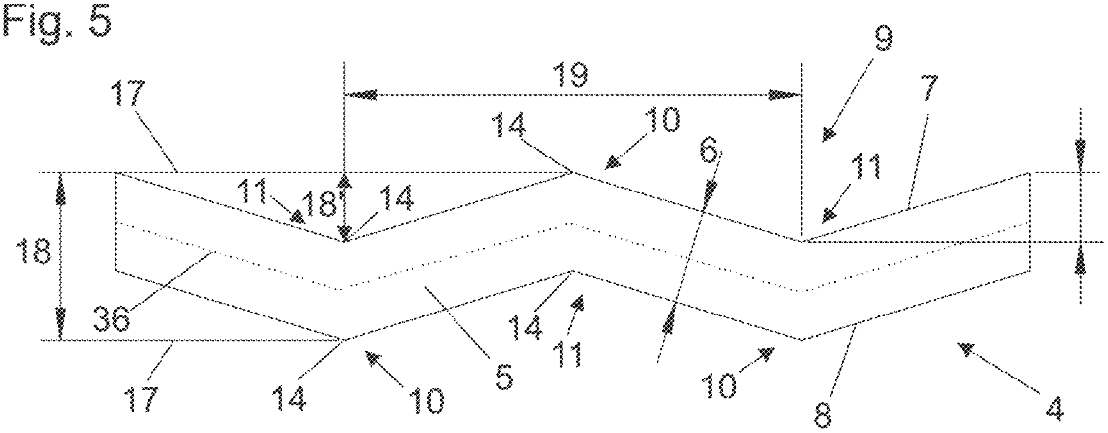
FIG. 5 is a cross section of a regular arrangement of a furniture fitting according to the invention in a schematic representation.

FIG. 5 shows a metal sheet 4 with two surfaces 7, 8 that are spaced apart from one another by a material thickness 6 of the metal sheet 4, wherein both surfaces 7, 8 have a (schematically represented) regular arrangement 9 of successive elevations 10 and depressions 11, wherein an elevation 10 on one of the two surfaces 7, 8 lies opposite a depression 11 on the other of the two surfaces 8, 7, and vice versa. The material thickness 6 of the metal sheet 4 is (not limitatively) chosen to be 0.5 mm.

A neutral axis 36 is drawn in schematically with a dashed line in the sense of a reference plane relative to the elevations 10 and depressions 11 (due to the introduction of the regular arrangement 9).

Figure 6A:
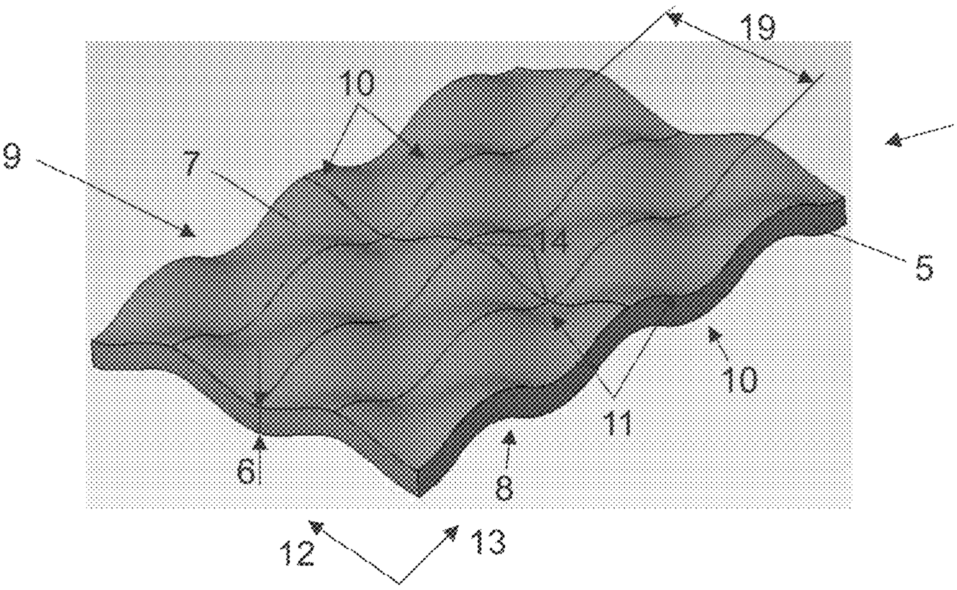
FIGS. 6*a*-6*b* show a regular arrangement of a furniture fitting according to the invention in a perspective view.

FIG. 6*a* shows a three-dimensional design of the regular arrangement 9, wherein the regular arrangement 9 extends in a first direction 12 and in a second direction 13 transverse to the first direction 12, with the result that arranged adjacent to a depression 11 in each case is a first elevation 10 in the first direction 12 and a second elevation 10 in the second direction 13.

On each surface 7, 8, maxima 14 of the elevations 10 and depressions 11 of the regular arrangement 9 are arranged on imaginary lines (in imaginary common planes 17) which are arranged parallel to one another. The elevations 10 and depressions 11 of a first line are offset by half a spacing 19 (half of the spacing distance 19) between two elevations 10 or depressions 11 compared with the elevations 10 and depressions 11 of a second line directly adjacent to the first line. As a result, an enhancement of the bending rigidity is particularly favored by a wave structure in two dimensions.

The elevations 10 and depressions 11 of the regular arrangement 9 are introduced due to a pressing-in of a pointed extension of a roller or a stamp, wherein a shape of the elevations 10 and depressions 11 is formed truncated-pyramid-like with a fillet radius depending on the material thickness 6. Generally speaking, the shape can also be formed pyramid-shaped, conical or frustoconical.

On both surfaces 7, 8 three adjacent elevations 10 have maxima 14 which are arranged in each case in a common plane 17, wherein a normal spacing 18 of these planes 17 is increased by the regular arrangement 9 compared with the material thickness 6. In this embodiment, an increase of 0.2 mm in the material thickness due to the elevations 10 and depressions 11 has been chosen.

Two elevations 10 and depressions 11 following one another directly on one of the two surfaces 7, 8 have a spacing 19 of 3.5 mm, which can however be adapted depending on the requirements of the furniture fitting 1.

Figure 6B:
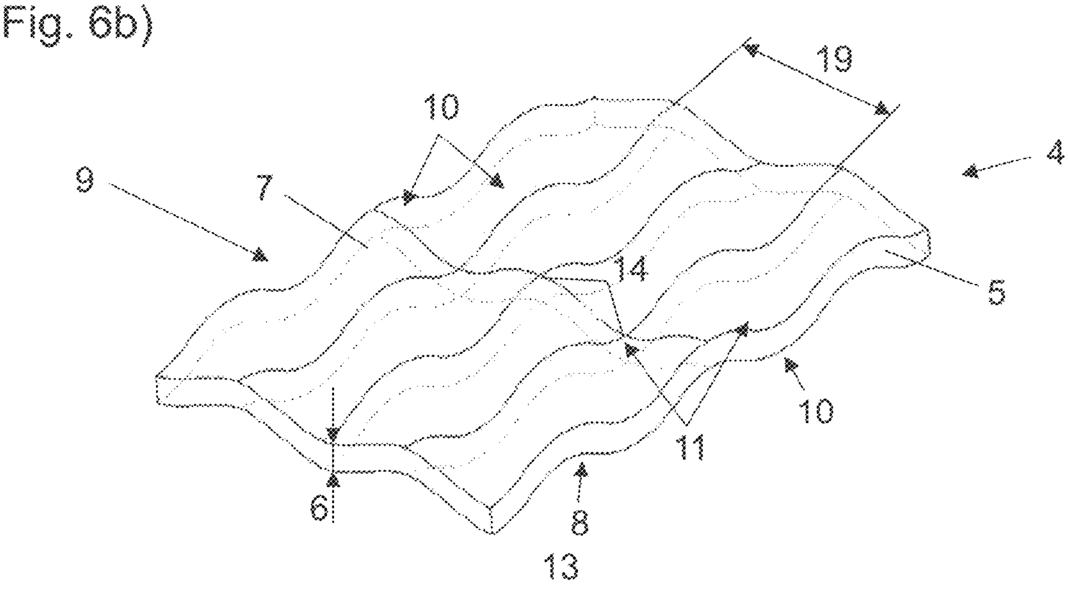

FIG. 6*b* shows the surface structure of the regular arrangement 9, wherein a lower contour of the elevations 10 and depressions 11 is indicated with dashed lines. As a result, it can be seen that the material thickness 6 of the metal sheet 4 is the same or constant over the entire area of the regular arrangement 9 (disregarding varying plastic deformations between the maxima 14 and edges of the elevations 10 and depressions 11).

Two elevations 10 and depressions 11 following one another directly have a spacing 19 on one of the two surfaces 7, 8, wherein the spacing 19 has been chosen to be five times as large as the normal spacing 18.

The planes 17 between the maxima of the elevations 10 and the maxima 14 of the depressions 11 have a normal spacing 18', which is 0.2 times as large as the material thickness 6 of the metal sheet 4.

Figure 7:
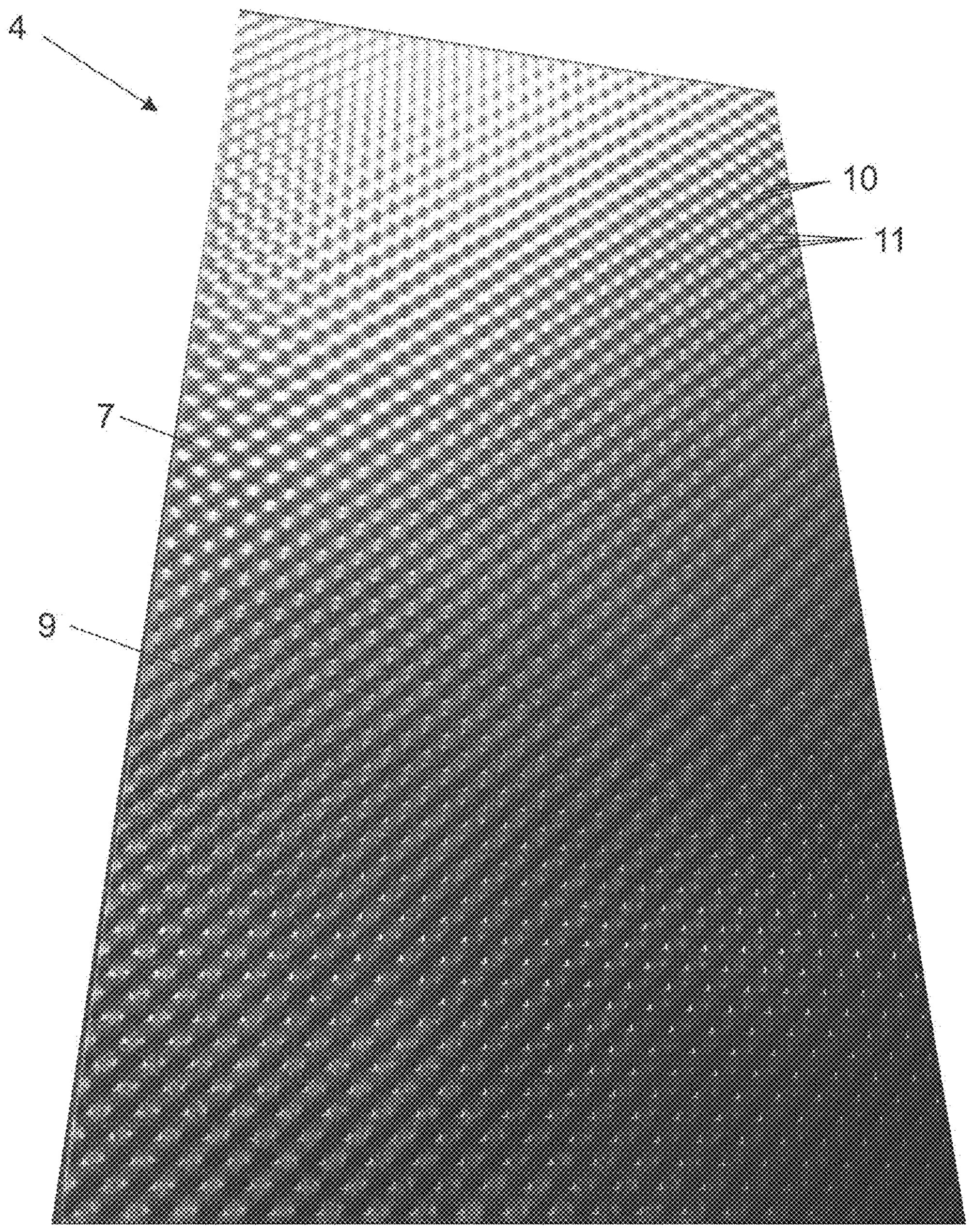
FIG. 7 shows a metal sheet with a regular arrangement for a furniture fitting according to the invention in a view from above.

FIG. 7 shows the metal sheet 4 for producing the furniture fitting 1, wherein the regular arrangement 9 of successive elevations 10 and depressions 11 has a periodicity. The periodicity is formed in the form of a two-dimensional alternation of elevations 10 and depressions 11 (analogously to a sinusoidal wave structure).

Punchings 29 and/or embossings 16 can be performed before a bending procedure and/or after a bending procedure for forming the component 20.

Figure 8:
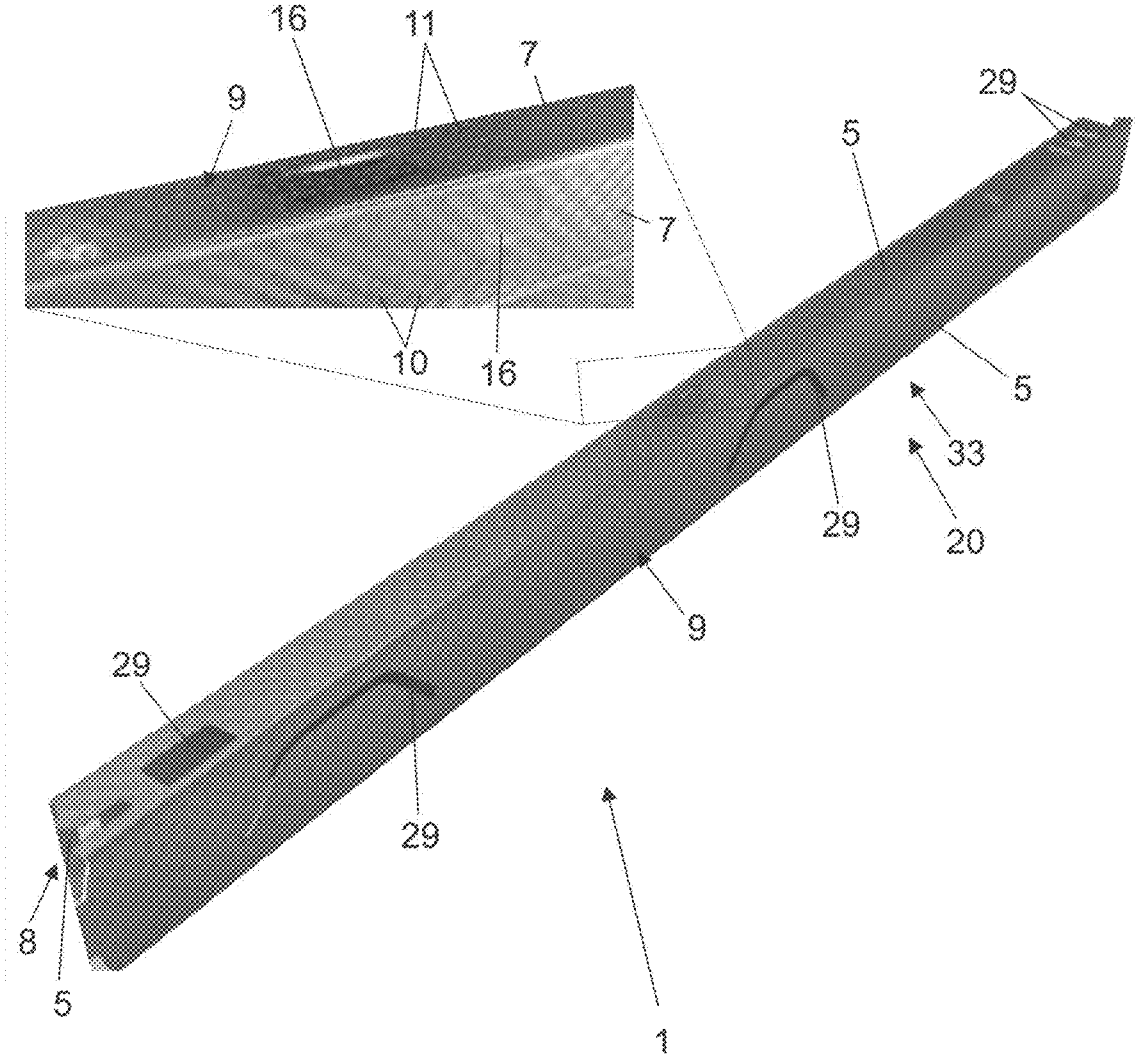
FIG. 8 shows a furniture fitting in the form of a runner according to a preferred embodiment example in a perspective view with a detailed view of the runner.

FIG. 8 shows a runner 33, wherein in the detailed view it can be seen that the metal pieces 5 have embossings 16, which extend over a plurality of elevations 10 and depressions 11 of the regular arrangement 9.

Generally speaking, different metal pieces 5 can have different regular arrangements 9 with specific geometries. Varying regular arrangements 9 within a metal piece 5, which can differ for example in the periodicity, the spacing 19 and/or a normal spacing 18, 18', are also conceivable. The regular arrangement 9 extends over 100% of the furniture fitting 1.

Figure 9A:
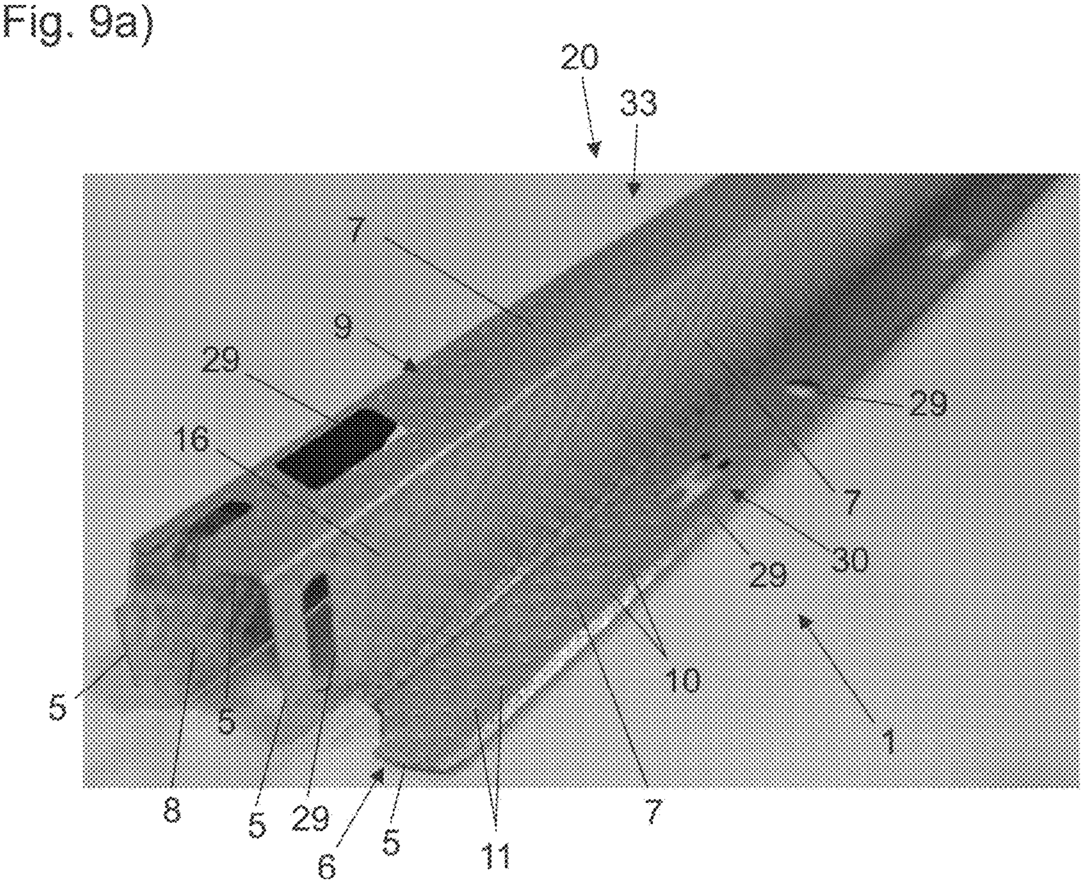
FIGS. 9*a*-9*b* show a detailed view of a furniture fitting in the form of a runner according to a further preferred embodiment example in a perspective view and a view from above.

FIG. 9*a* shows that the metal pieces 5 are arranged on a profiled component 20 of the furniture fitting 1, wherein the component 20 is formed U-shaped in a cross section in areas. The regular arrangement 9 can be seen on both surfaces 7, 8 in the form of elevations 10 and depressions 11.

Figure 9B:
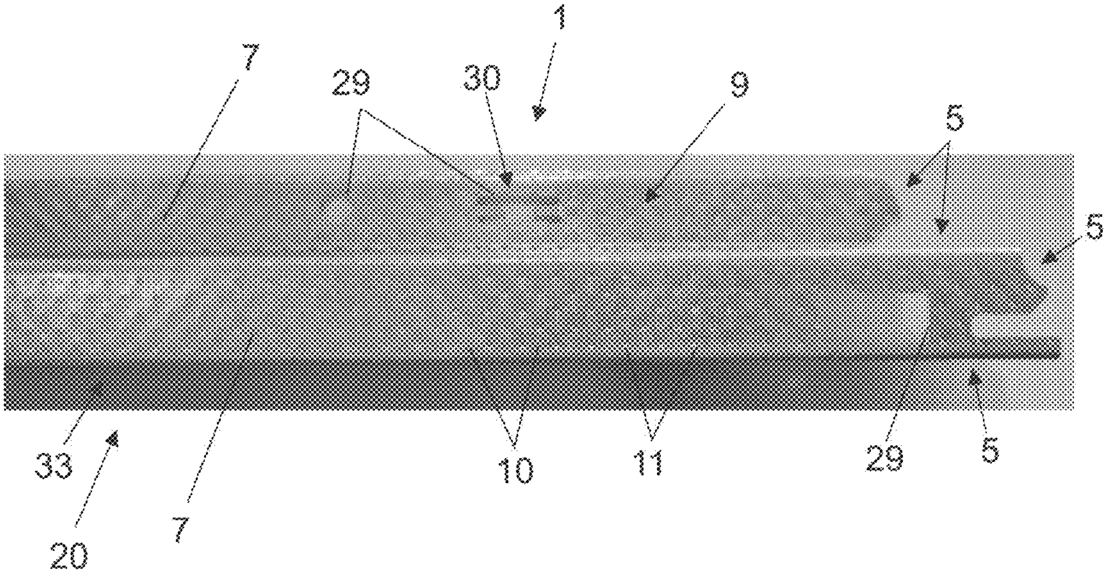

FIG. 9*b* differs from FIG. 9*a* merely in that the runner 33 is represented in a view from above. The detail of a surface structure of the regular arrangement 9 shows that the metal pieces 5 have punching 29 and among other things are formed as a fastening member 30 for a furniture component.

Figure 10A:
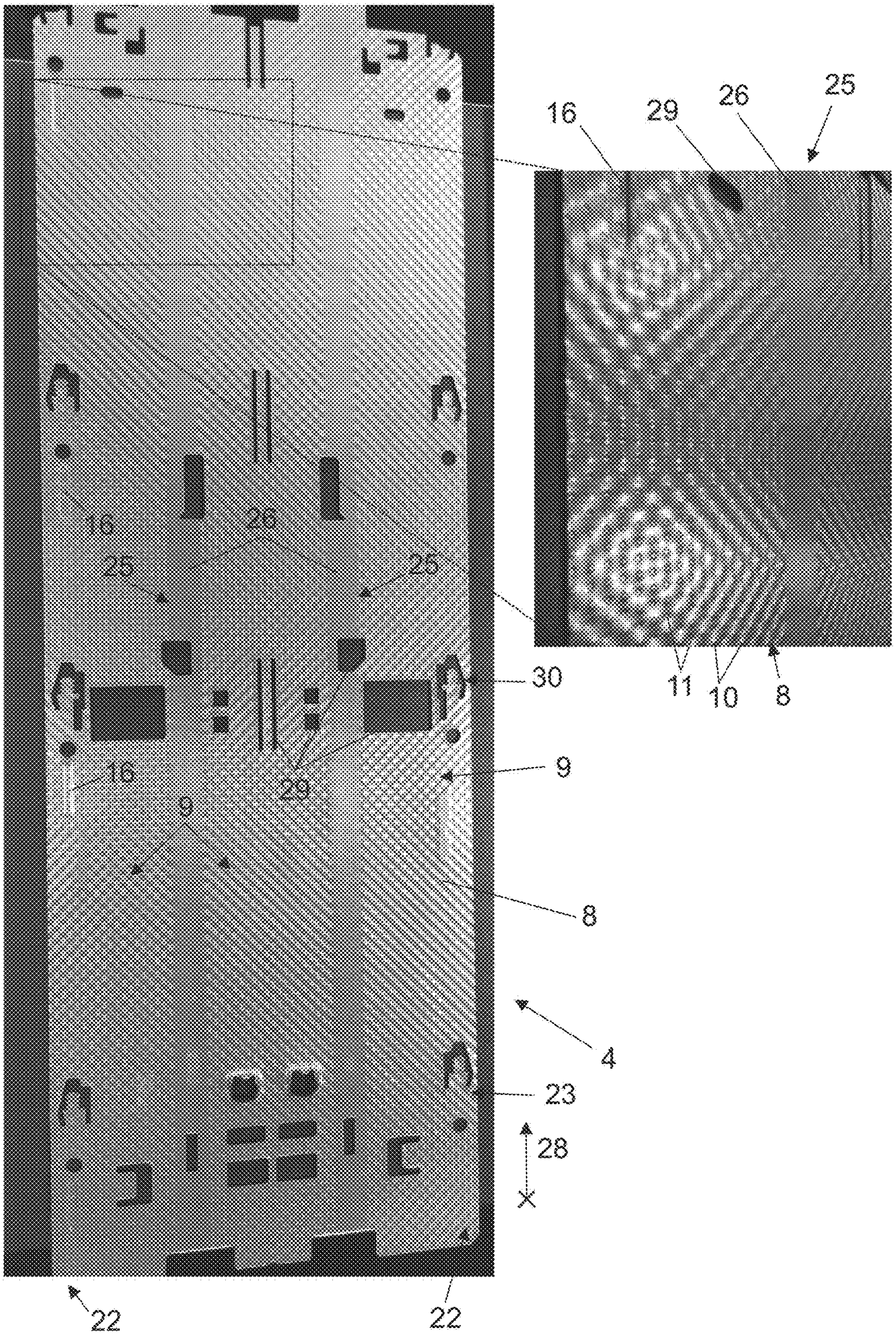
FIG. 10*a* shows a metal sheet with a regular arrangement for a furniture fitting in the form of a runner according to a further preferred embodiment example with two running surfaces, embossings and punchings before a bending procedure in a view from above with a detailed view.

FIG. 10*a* shows a metal sheet 4 with a regular arrangement 9, wherein the regular arrangement 9 extends over extensive local areas. Generally speaking, the local area can also be arranged only at an edge 22 of a metal piece 5 and/or at a connection point 23 of a metal piece 5, at which the metal piece 5 is connected or can be connected to a further component 24 of the furniture fitting 1.

In this embodiment, the metal sheet 4, which comprises the metal pieces 5 after a bending procedure, has two flat surfaces 25 which are free of regular arrangement 9.

An exemplary method sequence via which the furniture fitting 1 can be manufactured is indicated below:

- a flat metal sheet 4 without a regular arrangement 9 is provided,
- a regular arrangement 9 of successive elevations 10 and depressions 11 is incorporated in the metal sheet 4 on the two surfaces 7, 8 that are spaced apart from one another by the material thickness 6 of the metal sheet 4, wherein an elevation 10 on one of the two surfaces 7, 8 lies opposite a depression 11 on the other of the two surfaces 7, 8, and vice versa, the regular arrangement 9 is incorporated into the metal sheet 4 by a stamp and/or two rollers starting from both surfaces 7, 8, and the neutral axis 36 of the metal sheet 4 is lengthened during the incorporation of the regular arrangement 9 and the metal sheet is stretched in the area in which the regular arrangement 9 is incorporated, and by bending, punching, cutting, coating, and/or embossing steps, the metal sheet 4 is formed into the component 20 of the furniture fitting 1 to be produced.

Generally speaking, the bending, punching, cutting, coating and/or embossing steps can be effected after the incorporation of the regular arrangement 9 or following the incorporation.

In a further method step, an embossing 16 which extends over a plurality of elevations 10 or depressions 11 of the regular arrangement 9 can be embossed into the metal sheet 4.

In this embodiment of the invention, two strip-shaped surfaces 25 of the metal sheet 4 have been left blank during the incorporation of the regular arrangement 9 in order to utilize the surface areas 25 as tracks for rolling elements 27.

In the case of a plurality of regular arrangements 9, the regular arrangements 9 differ from one another in terms of their geometry.

In a further method step the component 20 can be connected to further components, for example by gluing, riveting, TOX clinching, soldering and/or welding. Fitting with a drive device, a damper and/or the like is also possible in order to broaden the functionality of the furniture fitting 1.

Figure 10B:
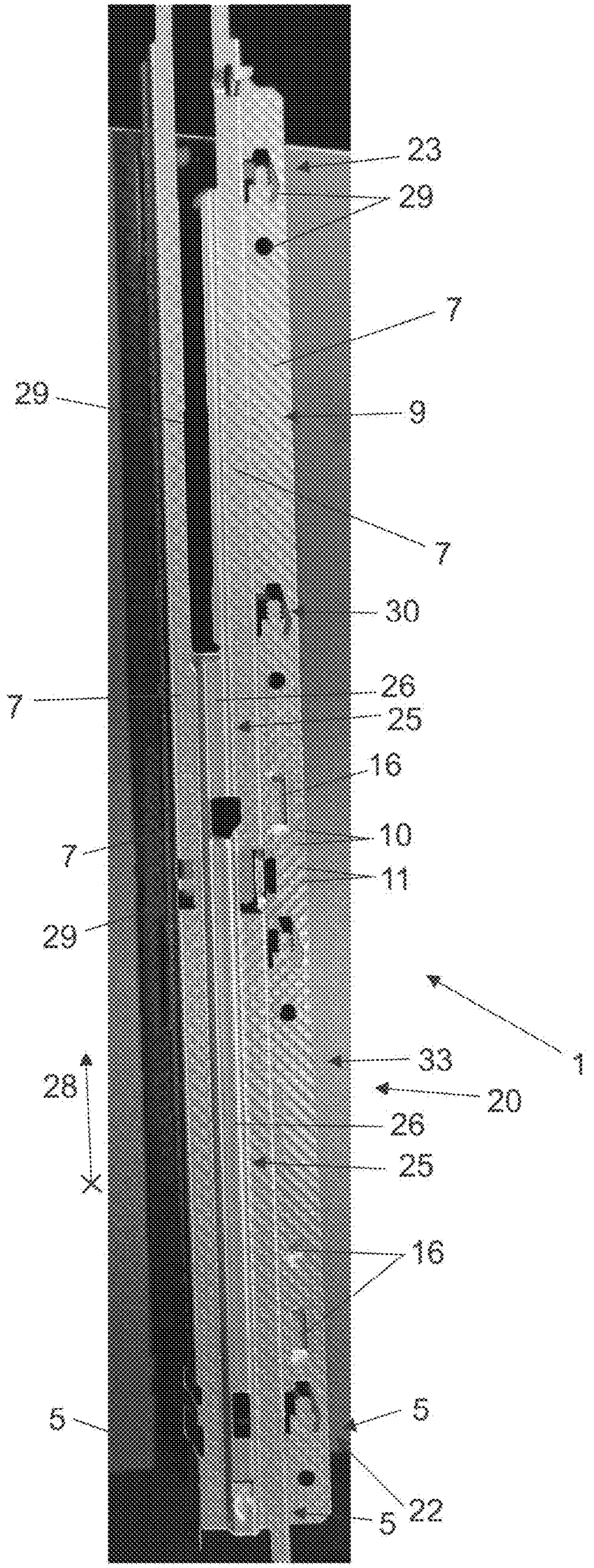
FIG. 10*b* shows the furniture fitting after a bending procedure and a further punching of the metal sheet according to FIG. 10*a* in a view from above.

FIG. 10*b* shows the furniture fitting 1 as a runner 33, wherein the metal pieces 5 have a first sound absorption value in the area of the flat surface areas 25, and the metal pieces 5 have a second sound absorption value in an area with the regular arrangement 9, wherein the second sound absorption is increased by 10% compared with the first sound absorption. Analogously, a second rigidity in the area of the regular arrangement 9 is increased by 10% compared with a first rigidity in the area without regular arrangement 9.

The two flat surfaces 25 are formed as running surfaces 26 for rolling elements 27 moving on the running surface 26 (cf. FIG. 2*b*), wherein the metal pieces 5 have a longitudinal direction 28 and the running surfaces 26 are formed as a track, which is aligned parallel to the longitudinal direction 28 of the metal pieces 5.

In the case of a piece of furniture with a first furniture part and a second furniture part, the furniture fitting 1, with which the first furniture part is movably mounted on the second furniture part, can be used.

The invention claimed is:

1. An arrangement for mounting a drawer on a furniture carcass, the arrangement comprising:

a furniture guide configured to allow relative movement between the drawer and the furniture carcass, the furniture guide including a furniture fitting being a runner, the runner including:

a rolling element, and a metal piece manufactured from a metal sheet, and having two surfaces spaced apart from one another by a material thickness of the metal sheet, at least one of the two surfaces being a running surface, and the rolling element being movable along the running surface to allow the drawer to move relative to the furniture carcass, wherein the two surfaces have a regular arrangement of successive elevations and depressions, wherein each elevation on a first one of the two surfaces lies opposite a respective depression on a second one of the two surfaces, and each elevation on the second one of the two surfaces lies opposite a respective depression on the first one of the two surfaces, wherein the regular arrangement extends in a first direction and in a second direction transverse to the first direction such that arranged adjacent to each depression is a first adjacent elevation in the first direction and a second adjacent elevation in the second direction, and wherein the metal piece has a punching in the regular arrangement.

2. The arrangement according to claim 1, wherein, on each of the two surfaces, maxima of the elevations and depressions of the regular arrangement are located on imaginary planes substantially parallel to one another.

3. The arrangement according to claim 2, wherein the elevations and depressions along each line in a first one of the imaginary planes are spaced apart by a spacing distance, and the elevations and depressions arranged along a first line are offset from the elevations and depressions of a second line directly adjacent to the first line by an offset distance equal to half of the spacing distance between two elevations or depressions.

4. The arrangement according to claim 1, wherein:

the elevations and/or depressions of the regular arrangement are shaped substantially pyramidal, conical, truncated-pyramidal, or frustoconical, the material thickness of the metal sheet is substantially uniform over an entire area of the regular arrangement, the metal piece has an embossing extending over at least two elevations and/or depressions of the regular arrangement, the regular arrangement of successive elevations and depressions has a periodicity, the material thickness of the metal sheet is in a range between 0.3 mm and 2.5 mm, each of the two surfaces has at least three elevations adjacent to one another and having maxima located in a common plane, wherein a normal spacing between the common planes of the first one of the two surfaces and the second one of the two surfaces is between 0.1 mm and 1.0 mm larger than the material thickness of the metal sheet, or two elevations and/or two depressions directly adjacent to one another on one of the two surfaces have a spacing distance of between 1.6 mm and 21.0 mm.

5. The arrangement according to claim 4, wherein:

the material thickness of the metal sheet is in a range between 0.5 mm and 0.7 mm, inclusive, the normal spacing between the common planes of the first one of the two surfaces and the second one of the two surfaces is between 0.2 mm and 0.4 mm larger than the material thickness of the metal sheet, or the two elevations and/or two depressions directly adjacent to one another on one of the two surfaces have a spacing distance of between 3.5 mm and 6.5 mm.

6. The arrangement according to claim 1, wherein:

each of the two surfaces has at least three elevations adjacent to one another having maxima arranged in a common plane, wherein the common planes of the two surfaces have a normal spacing, and two elevations and/or two depressions directly adjacent to one another on one of the two surfaces have a spacing in a range of 2 to 8 times as large as the normal spacing, or one of the two surfaces has at least three elevations adjacent to one another having maxima arranged in a common plane, and has at least three depressions adjacent to one another having maxima arranged in a common plane, wherein the common planes have a normal spacing between 0.1 and 0.6 times as large as the material thickness of the metal sheet.

7. The arrangement according to claim 6, wherein:

the two elevations and/or two depressions directly adjacent to one another on one of the two surfaces have a spacing in a range of 4 to 6 times as large as the normal spacing, or the normal spacing of the common planes is between 0.2 and 0.4 times as large as the material thickness of the metal sheet.

8. The arrangement according to claim 1, wherein the regular arrangement:

extends over more than 50% of the at least one metal piece, or extends only over a local area at which the metal piece is connected to a further component of the furniture fitting.

9. The arrangement according to claim 8, wherein the regular arrangement:

extends over more than 75% of the furniture fitting, or extends only over the local area, and the local area is arranged at an edge of the metal piece and/or at a connection point of the metal piece at which the metal piece is connected to a further component of the furniture fitting.

10. The arrangement according to claim 1, wherein the metal piece has a flat surface free of the regular arrangement.

11. The arrangement according to claim 10, wherein the metal piece has a first sound absorption value in an area of the flat surface, and the metal piece has a second sound absorption value in an area with the regular arrangement, wherein the second sound absorption value is at least 1.1 times greater than the first sound absorption value.

12. The arrangement according to claim 11, wherein the second sound absorption value is at least 1.5 times greater than the first sound absorption value.

13. The arrangement according to claim 10, wherein:

the metal piece has a first rigidity in the area of the flat surface, and the metal piece has a second rigidity in an area with the regular arrangement, wherein the second rigidity is at least 1.1 times greater than the first rigidity, or the flat surface is a running surface for a rolling element moving on the running surface.

14. The arrangement according to claim 13, wherein:

the second rigidity is at least 1.5 times greater than the first rigidity, or the metal piece has a longitudinal direction, and the running surface is a track aligned substantially parallel to a longitudinal axis of the metal piece.

15. The arrangement according to claim 1, wherein the metal piece has at least two geometrically different regular arrangements.

16. The arrangement according to claim 1, wherein:

the punching is configured to receive a fastening member, and/or is a fastening member for fastening a furniture component, and/or is substantially cylindrical, and/or is configured to mount a hinge pin, and/or is configured to release an adjustment element of an adjustment device, so that the adjustment element is actuatable by a tool, the metal piece is arranged on a profiled component of the furniture fitting, and the profiled component is U-shaped in a cross section at least in areas, or the furniture fitting is a runner, flap fitting or hinge.

17. A piece of furniture comprising:

a furniture carcass, a drawer movably mounted to the furniture carcass, and the arrangement according to claim 1 configured to movably mount the drawer to the furniture carcass.

18. A method for producing the arrangement according to claim 1, the method comprising producing the runner of the furniture guide by a process including:

providing a flat metal sheet, in at least a portion of the metal sheet, forming the regular arrangement of successive elevations and depressions on the two surfaces spaced apart from one another by the material thickness of the metal sheet, forming the metal sheet into a component of the furniture fitting by at least one of bending, punching, cutting, coating, and/or embossing.

19. The method according to claim 18, wherein:

the at least one of bending, punching, cutting, coating, and/or embossing is performed after the forming of the regular arrangement, the regular arrangement:

is formed in the at least a portion of the metal sheet by a stamp and/or a roller, and/or is formed starting from both of the two surfaces, and the formation of the regular arrangement is performed so that a neutral axis of the metal sheet is lengthened.

20. The method according to claim 18, wherein the metal sheet is stretched during the forming of the regular arrangement at least in the portion in which the regular arrangement is formed.

21. The method according to claim 18, wherein the forming of the metal sheet into a component of the furniture fitting includes embossing over at least two elevations or depressions of the regular arrangement into the metal sheet.

22. The method according to claim 18, wherein the forming of the regular arrangement includes leaving a strip-shaped surface area of the metal sheet blank without the regular arrangement.

23. The method according to claim 18, wherein the regular arrangement is a first regular arrangement formed in a first portion of the metal sheet, the method further comprising forming a second regular arrangement on the two surfaces of a second portion of the metal sheet, wherein the second regular arrangement is geometrically different from the first regular arrangement.

24. The method according to claim 18, further comprising:

connecting the component to a second component, and/or fitting the furniture fitting with a drive device and/or a damper.

25. The method according to claim 24, wherein the component is connected to the second component by gluing, riveting, TOX clinching, soldering, and/or welding.

26. The method according to claim 18, wherein the providing of the metal sheet, the forming of the regular arrangement, and the forming of the metal sheet into the component are performed in order as recited.

27. The arrangement according to claim 1, wherein the metal piece is a connecting piece of the runner.

28. The arrangement according to claim 1, wherein the regular arrangement is configured such that the first adjacent elevation and the second adjacent elevation are arranged directly adjacent to and contacting each depression in the first direction and in the second direction, respectively.

* * * * *